Figure 6:
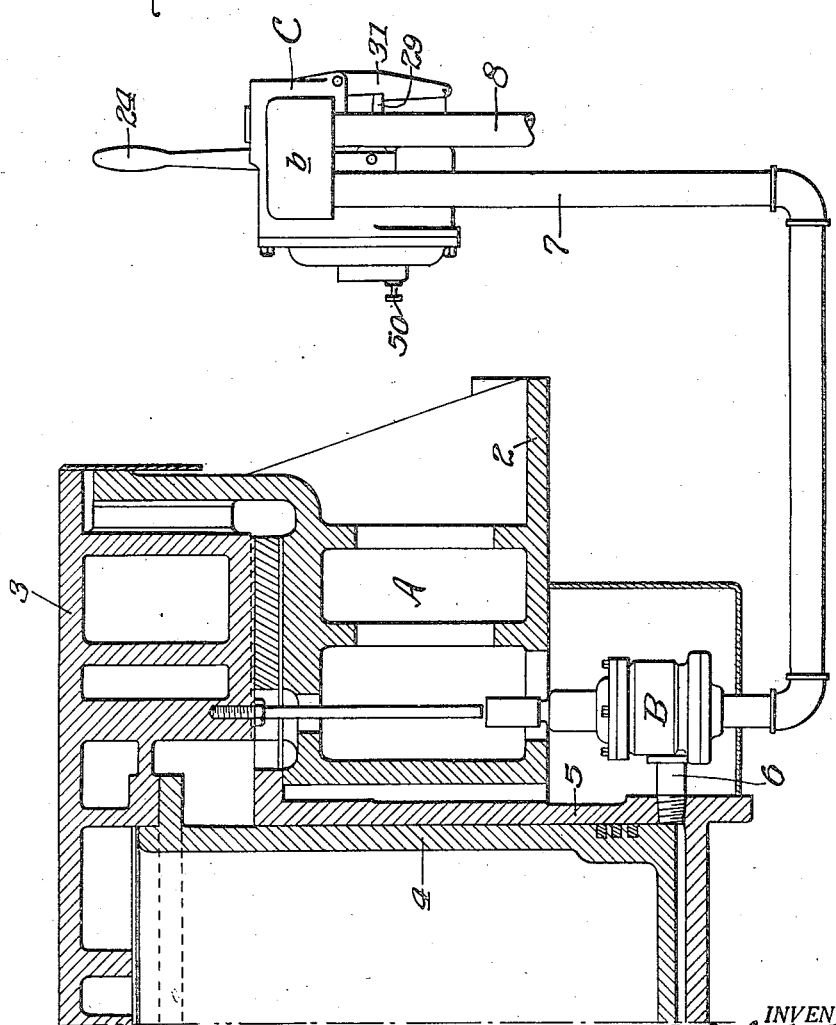

May 1, 1934.  R. F. RINGLE  1,956,962
TIMING VALVE
Filed Jan. 27, 1931  3 Sheets-Sheet 1
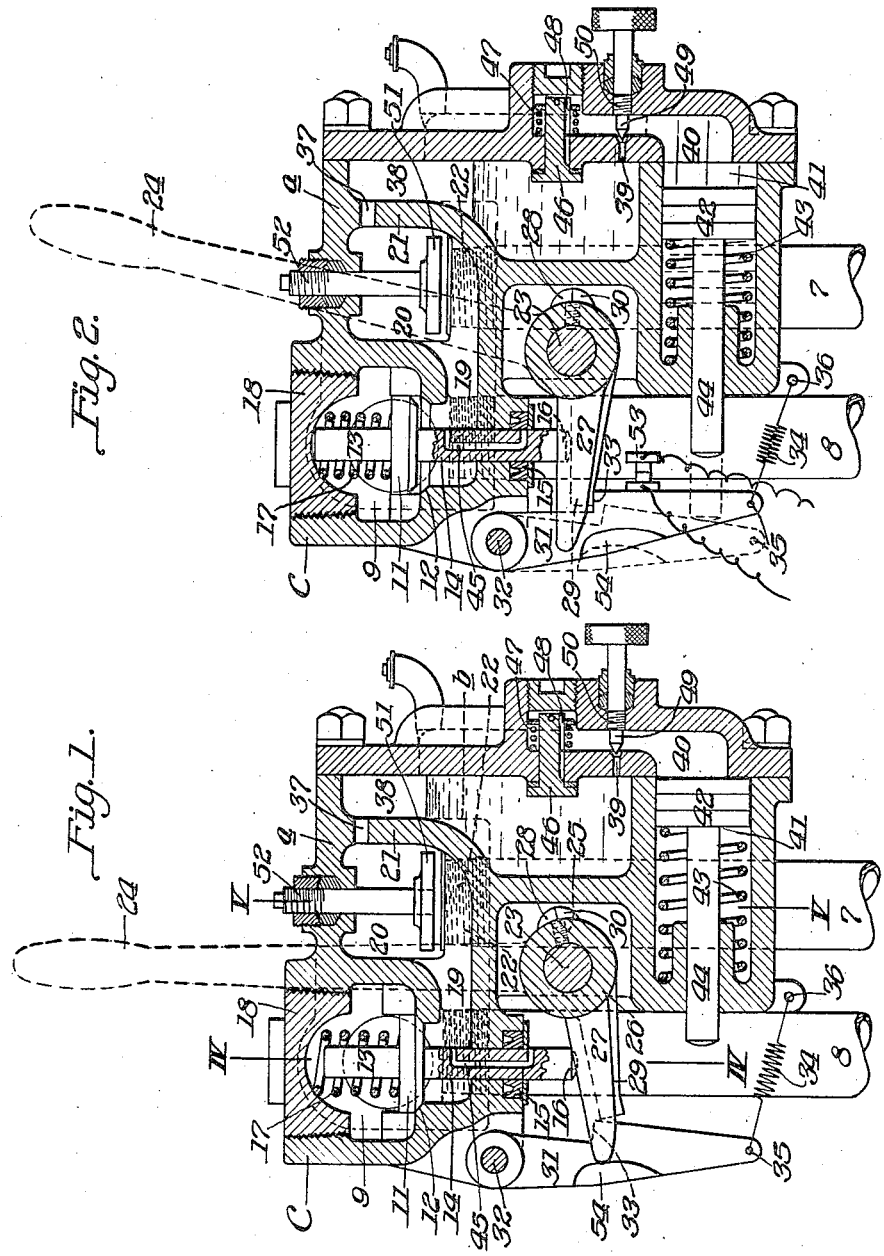
INVENTOR.
Robert F. Ringle
BY Clarke & Doolittle
ATTORNEYS.

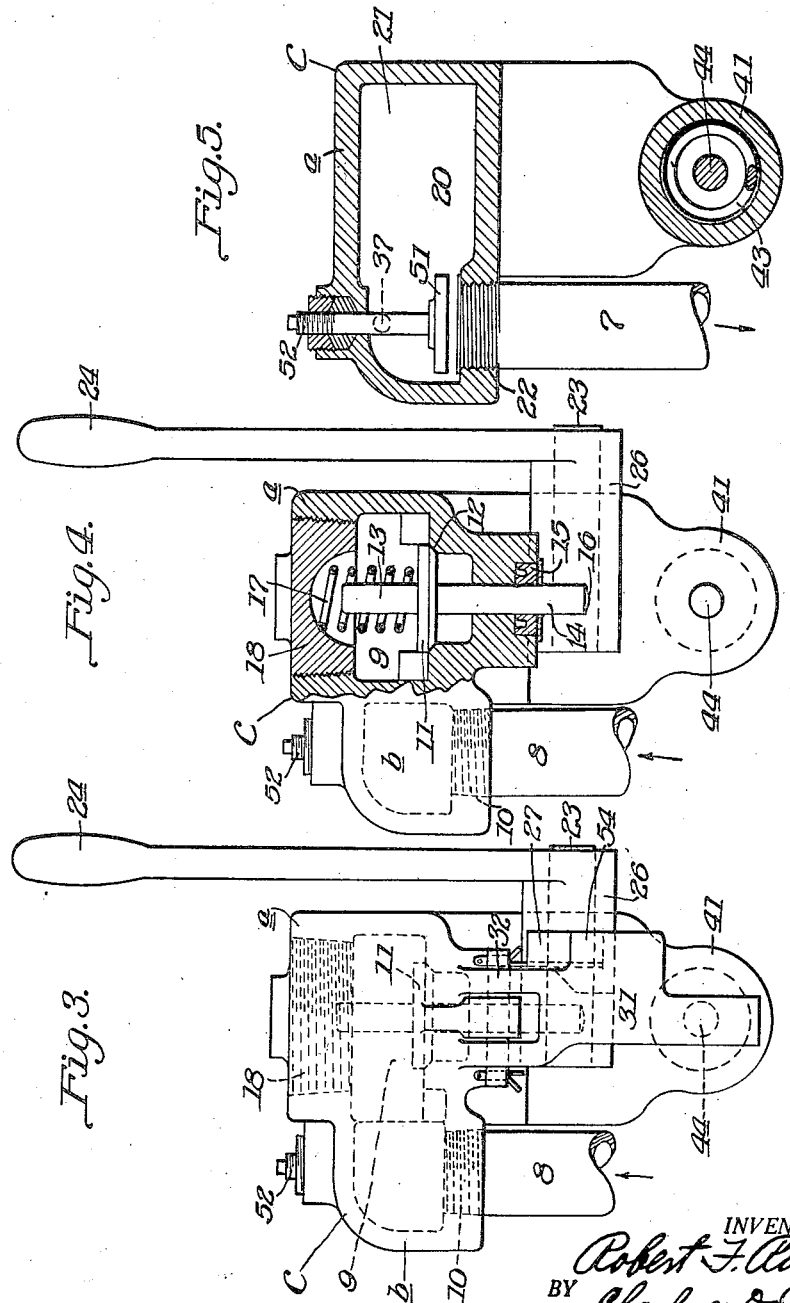

Patented May 1, 1934

1,956,962

UNITED STATES PATENT OFFICE 1,956,962

TIMING VALVE

Robert F. Ringle, Zelienople, Pa., assignor to Herman Pneumatic Machine Company, Zelienople, Pa., a corporation of Pennsylvania Application January 27, 1931, Serial No. 511,501

9 Claims. (Cl. 137—139)

My invention relates to improvements in fluid-actuated timing valves, particularly designed in connection with a bumping machine or the like for molding flasks, wherein it is desirable to permit the machine to operate for a definite length of time, thereby imparting the required number of movements for each complete operation.

This invention has in view to provide a timing valve mechanism which may be applied to a fluid-actuated machine, and which is operable by means of the fluid to regulate the passage thereof to said machine. However, my invention is not to be limited to the particular application above, and may be operated by means of an independent fluid source for controlling the operation of any machine or device.

Additional objects and advantages of my invention will become apparent from the following description taken in connection with the accompanying drawings, wherein:

Fig. 1 is a part longitudinal sectional and part elevational view of a timing valve embodying my invention, showing the parts thereof in normal position;

Fig. 2, a view similar to Fig. 1, showing the parts in operative position;

Fig. 3, a view in end elevation;

Fig. 4, a vertical section taken on the line IV—IV of Fig. 1;

Fig. 5, a vertical section taken on the line V—V of Fig. 1; and

Fig. 6, a diagrammatic view illustrating the application of the timing valve to a bumping machine.

Referring to the drawings, a bumping machine of the character designated is shown at A, and comprises a base 2 for mounting a reciprocable bumping table 3 for flask agitation. The bumping machine is motivated by means of a piston or plunger 4 secured to the table 3, and disposed within a cylinder 5 for actuation by any suitable fluid under pressure, as air, through a conduit 6, said fluid being intermittently supplied to and exhausted from the cylinder by means of an automatic valve of any suitable construction, to provide the bumping action of the machine, said valve being diagrammatically shown at B in Fig. 6.

For the purpose of controlling the operation of the bumping machine A by regulating the flow of fluid to the valve B, I provide a timing valve, generally designated C, having an outlet conduit 7 connecting with the intake side of the automatic valve B, and an inlet conduit 8 communicating with any suitable fluid source, as for example an air compressor system.

The inlet conduit 8 communicates with a valve chamber 9 formed in the body $a$ of the timing valve C by means of a threaded opening 10 in the bottom wall of a laterally extending body portion $b$. A vertically movable valve 11 is disposed in said chamber for cooperation with a valve seat 12, and is formed with an upper stem portion 13 and a lower stem portion 14, the latter extending downwardly through a packing gland 15 and having a rounded end 16 outside the valve body $a$. The upper stem portion 13 is surrounded by a spring 17 which contacts with a valve chamber closure plug 18 at one end, and has its other end in engagement with the valve 11 to normally seat the same, thereby closing the communicating passage 19 between said valve chamber and a discharge chamber 20.

The discharge chamber 20 is formed integrally with the body $a$ including a partition wall 21, and is formed with a threaded opening 22 in the bottom wall of the laterally extending body portion $b$, for receiving an end of the outlet conduit 7.

A transverse shaft 23 is rotatably mounted in the body $a$ adjacent the lower end 16 of the valve stem portion 14. An operating lever 24 is secured to said shaft by means of a set screw 25 in the hub portion 26, said hub portion being formed with an extending pawl 27 and a radial abutment 28. Freely rotatable on the shaft 23 and positioned in alinement with the end 16 of the valve stem, I provide a latch 29, having an extending radial abutment 30 coacting with the abutment 28 to maintain the said latch in extended position directly beneath the said end 16 of the valve stem.

A trip lever 31 is pivoted to the valve casing at 32, and has a shoulder 33 for engagement by the end of the latch 29. A tension spring 34 secured to the end 35 of said trip lever and to the casing at 36, urges the lever 31 toward the latch. Thus, to open the valve 11 for the admission of fluid, the lever 24 is rotated clockwise, having reference to Figs. 1 and 2, whereby the abutments 28 and 30 coact to rotate the latch 29 upward and into engagement with the end 16 of the valve stem. Further rotation will open the valve 11, and the shoulder 33 of trip lever 31 will engage under the end of the latch as in Fig. 2, to maintain said valve in open position.

The fluid admitted by means of the valve 11 passes from the chamber 9 through the communicating passage 19 into the discharge chamber 20, and thence through the opening 22 to the outlet conduit 7. Said fluid also passes through an opening 37 in the partition wall 21 into a pressure chamber 38 containing oil or some other substantially viscous fluid.

The pressure of the operating fluid or air upon the oil in the chamber 38 forces said oil through an orifice 39 at the lower portion of said chamber and into a passage 40 communicating with a cylinder 41, wherein the oil under pressure actuates a piston or plunger 42 against the action of a spring 43. The rod 44 of said piston extends beyond the end of the cylinder and is in the plane of the trip lever 31. The continued operation of the timing valve gradually displaces sufficient of the oil from the chamber 38 to move the piston 42 and rod 44 to the dotted line position of Fig. 2, whereby the piston rod 44 contacts with the trip lever 31 to rotate the same about its pivot 32, disengaging the latch 29 from the shoulder 33 and permitting the valve 11 to close by means of its spring 17.

The pressure in the chamber 38 will be immediately released through the outlet opening 22 and a by-pass 45 in the lower valve stem portion 14, releasing pressure in chamber 38, permitting the spring 43 to replace the piston 42 thereby returning the oil to the chamber 38 through a fluid passage 48 in the stem of return valve 46. Said valve has a spring 47 thereon for normally maintaining it in closed position, but is opened inwardly by pressure in chamber 40 for quick return of liquid therefrom to chamber 38, as well as through the throttled port 39.

It is therefore seen that the time of operation of the timing valve and the machine to which it is applied is equal to the time required for the oil to move the piston 42 a sufficient distance to trip the latch 29 by means of the trip lever 31. If then a constant pressure is maintained on the oil in the chamber 38, regulation of the orifice or opening 39 will effect a control of the operating time of the valve.

To this end, a needle valve 49 is entered in the orifice 39 and is threaded at 50 for adjustment thereof. Also, for the purpose of maintaining a substantially constant pressure in the chamber 38, the outlet opening 22 from the discharge chamber 20 is restricted by means of a disc 51 having a threaded adjusting stem 52 extending outside of the valve body. Said disc and stem are arranged in axial alinement with the opening 22.

It will be readily understood that my timing valve may be employed in connection with other machines or devices not dependent upon a fluid as an operating agent. Hence, fluid may be supplied at some constant pressure to the valve chamber 9 by means of the opening 10 from an independent source, to operate the valve in the manner described.

Suitable means may be applied to or connected with the handle 24, trip lever 31 or the latch 29, to control the operation of any machine. For example, electrical contacts 53 may be employed as in Fig. 2 in connection with the trip lever 31 to make and break an electric circuit to control the motive power of a machine or device, the time interval of operation being controlled by the pressure of the fluid from said independent source in conjunction with the needle valve 49 and orifice 39.

To enable the shutting off of the timing valve before its cycle of operation has been completed, I provide a cam lug 54 on and preferably integral with the trip lever 31, said lug being adapted to be engaged by the pawl 27 rotatable with the shaft 23 and lever 24. Thus, with the parts in the full-line or operating position of Fig. 2, rotation of the lever 24 counter-clockwise will trip the trip lever 31 and the latch 29 by means of the cam lug and pawl, whereby the valve 11 is closed to stop the operation of the device, or the contacts 53 are broken, as the case may be.

What I claim is:

1. A timing device actuated by means of a fluid under pressure consisting of a casing having a valve for admitting said fluid to the interior of the device, means for closing the valve, means for holding the valve open and for releasing and closing it, a chamber adapted to contain a second fluid, a piston chamber having regulated communication therewith, a spring-retracted piston therein having a rod for releasing the valve holding means, the fluid in the second named fluid chamber being subject to pressure of the first named fluid.

2. A timing device actuated by means of a fluid under pressure consisting of a casing having a valve for admitting said fluid to the interior of the device, a spring for closing the valve, an opening lever therefor and a co-acting holding latch, a trip lever for the latch, a piston chamber and a spring-retracted piston and rod therein for actuating the trip lever, a chamber communicating with the piston chamber adapted to contain a viscous second fluid, said fluid being subject to the pressure of the actuating fluid for operating the piston to release the trip lever, and means regulating flow between the viscous fluid chamber and the piston chamber.

3. A timing device actuated by means of a fluid under pressure consisting of a casing having a valve for admitting said fluid to the interior of the device, means for closing the valve, means for holding the valve open, an outgoing supply conduit from said interior, a throttling disk therefor having a threaded stem, a chamber adapted to contain a second fluid of high viscosity, said second fluid being subject to said pressure for releasing the valve, releasing mechanism actuated thereby, and means for returning the second fluid to said chamber upon releasing said valve.

4. A timing device actuated by means of a fluid under pressure consisting of a hollow body, a valve in the body for admitting said fluid thereto, a spring for closing the valve, a valve opening lever, latch movable with the lever, a trip lever having a shoulder for the latch and a cam abutment engageable by the lever, a pressure chamber in the body adapted to contain a second fluid having an inner partition wall provided with a port for conveying the actuating fluid to said chamber, and means operable by the second fluid to release the trip lever, said means including a cylinder for receiving the second fluid, a piston slidable therein, a spring for normally retracting the piston, said piston having a rod disposed in the path of the trip lever, means admitting a regulable pressure supply to the cylinder, and means for returning the second fluid to said chamber upon releasing said trip lever at the end of piston movement.

5. A timing device actuated by means of a fluid under pressure consisting of a hollow body, a valve in the body for admitting said fluid thereto, a spring for closing the valve, an opening lever, a latch movable with the lever, a trip lever having a supporting shoulder for the latch, a pressure chamber in the body adapted to contain a second fluid, a ported partition between the hollow body and the pressure chamber providing means for conveying the actuating fluid to the pressure chamber, means operable by the second fluid to release the trip lever, said means including a cylinder, means providing a regulable circulation between the pressure chamber and cylinder, and a spring-retracted piston in the cylinder having a rod disposed in the path of the trip lever, and means for returning the second fluid to said chamber upon releasing said trip lever.

6. A timing device actuated by means of a fluid under pressure consisting of a casing having a valve for admitting said fluid to the device, a supply pipe for actuating fluid and flow regulating means therefor, means for closing the valve, means for holding the valve open including a valve opening latch and a supporting trip lever therefor, means for releasing the trip lever including a fluid piston having a rod disposed in the path of said trip lever, a pressure chamber for containing a second fluid which fluid is subjected to the pressure of and displaced by the actuating fluid to operate the piston, and a spring retracted channelled valve for returning the second fluid to the chamber upon the release of the trip lever by the piston rod.

7. A timing device actuated by means of a fluid under pressure consisting of a casing having a valve for admitting said fluid to the device having a stem, a spring for closing the valve, means for holding the valve open including a step lifting latch and a shouldered swinging trip lever therefor, means for releasing the latch or movement of the trip lever including a spring retracted fluid piston having a rod disposed in the path of said trip lever, a pressure chamber for containing a second fluid which fluid is subjected to the pressure of and displaced by the actuating fluid, a piston chamber, means providing controlled circulation from the pressure chamber to the piston chamber to operate the piston, and a spring retracted channelled valve for returning the second fluid to the chamber upon the release of the trip lever by the piston rod and closing of the actuating fluid valve.

8. A timing device actuated by means of a fluid under pressure consisting of a hollow body, a valve in the body for admitting said fluid thereto, a spring for closing the valve, an opening lever, a latch movable with the lever, a trip lever having a supporting shoulder for the latch, a pressure chamber in the body adapted to contain a second fluid, a ported partition between the hollow body and the pressure chamber providing means for conveying the actuating fluid to the pressure chamber, and means operable by the second fluid to release the trip lever, said means including a cylinder, means providing a regulable circulation between the pressure chamber and cylinder, a spring-retracted piston in the cylinder having a rod disposed in the path of the trip lever, and supplemental means for returning the second fluid to said chamber upon releasing said trip lever.

9. A timing device actuated by means of a circulating fluid under pressure consisting of a hollow body having an incoming and outgoing conduit, an adjustable throttling device for the outgoing conduit, a valve in the body for admitting said fluid thereto from the incoming conduit, means for closing the valve, means for holding the valve open, a pressure chamber in the body for containing a second fluid subject to communicating pressure of said circulating fluid, a piston chamber and piston operable by the second fluid to release the valve, a channeled valve for releasing said pressure, and regulable means for returning the second fluid to said chamber upon the release of the valve.

ROBERT F. RINGLE.